United States Patent
Hashimoto et al.

(10) Patent No.: US 6,688,189 B2
(45) Date of Patent: Feb. 10, 2004

(54) ROBOT

(75) Inventors: Yasuhiko Hashimoto, Kobe (JP); Masami Ohtani, Kyoto (JP); Joichi Nishimura, Kyoto (JP)

(73) Assignee: Kawasaki Jukogyo Kabushiki Kaisha, Kobe (JP)

(*) Notice: Subject to any disclaimer, the term of this patent is extended or adjusted under 35 U.S.C. 154(b) by 0 days.

(21) Appl. No.: 09/837,109

(22) Filed: Apr. 18, 2001

(65) Prior Publication Data

US 2001/0035065 A1 Nov. 1, 2001

(30) Foreign Application Priority Data

Apr. 20, 2000 (JP) ......................................... 2000-119582

(51) Int. Cl.[7] .............................................. B25J 17/00
(52) U.S. Cl. ..................... 74/490.04; 74/89.22; 901/21; 414/935
(58) Field of Search .......................... 74/490.04, 89.22, 74/89.2, 89.21; 901/21; 414/935, 744.3, 277, 280, 281, 282; 187/251, 252, 253, 267, 268, 254; 403/109

(56) References Cited

U.S. PATENT DOCUMENTS

| | | | | |
|---|---|---|---|---|
| 3,777,629 A | * | 12/1973 | Johnston et al. ............ 212/231 |
| 4,547,119 A | * | 10/1985 | Chance et al. .............. 376/261 |
| 5,020,323 A | | 6/1991 | Hurlimann |
| 5,346,438 A | * | 9/1994 | Gerstenberger et al. .... 474/151 |
| 5,733,096 A | * | 3/1998 | Van Doren et al. ......... 212/296 |
| 5,771,748 A | * | 6/1998 | Genov et al. ............ 414/744.3 |
| 5,775,170 A | * | 7/1998 | Genov et al. ................ 411/393 |
| 5,954,840 A | * | 9/1999 | Genov et al. ............ 414/744.5 |
| 5,993,142 A | * | 11/1999 | Genov et al. ............ 414/744.5 |
| 6,267,022 B1 | * | 7/2001 | Suzuki .................... 74/490.01 |
| 6,371,713 B1 | * | 4/2002 | Nishimura et al. ..... 414/222.13 |

FOREIGN PATENT DOCUMENTS

| | | |
|---|---|---|
| JP | 58-084435 | 5/1983 |
| JP | 62-297085 | 12/1987 |
| JP | 04-069186 | 3/1992 |
| JP | 08-295492 | 11/1996 |
| JP | 09-036200 | 2/1997 |
| JP | 11-70487 | 3/1999 |
| JP | 11-087461 | 3/1999 |
| JP | 11-260890 | 9/1999 |
| JP | 2000-117670 | 4/2000 |

* cited by examiner

Primary Examiner—David A. Bucci
Assistant Examiner—Julie K. Smith
(74) Attorney, Agent, or Firm—Marshall, Gerstein & Borun LLP

(57) ABSTRACT

Provided is a robot comprising a telescopic-drive mechanism which does not contaminate works in a purified environment such as a clean room, is easy to handle, and requires no cover for covering the telescopic-drive mechanism. A robot comprises: an up-down axis in which a plurality of hollow axis sectional elements telescopically continue; and a telescopic-drive mechanism for driving the up-down axis to be vertically extended or retracted between an extended state in which a tip end of the up-down axis extends with respect to a base end thereof and a retracted state in which the tip end is moved close to the base end, wherein the telescopic-drive mechanism is integrated on one side of the up-down axis without being exposed from the up-down axis.

22 Claims, 16 Drawing Sheets

ROBOT

BACKGROUND OF THE INVENTION

1. Field of the Invention

The present invention relates to a vertically telescopic robot and, more particularly to a robot suitable for operation in a clean room.

2. Description of the Related Art

Conventionally, in manufacturing equipment installed in a clean room, such as semiconductor wafer manufacturing equipment, when a large stroke of vertical movement is required, a cylindrical coordinates robot a shown in FIGS. 1, 2 is used for handling a work w such as a semiconductor wafer.

As shown in FIG. 1, to rotate and convey the work w in a horizontal plane in θ direction around Z-axis, the cylindrical coordinates robot a is structured such that a column-shaped Z-axis member e is provided upwardly from an upper face d of a rotating member c pivotally mounted on a base unit b, and a horizontal member f having a wafer handling unit g is mounted on the Z-axis member e such that it is vertically movable. The wafer handling unit g is mounted such that it can reciprocate in X-axis direction (horizontal direction) in FIG. 1. According to the configuration of the cylindrical coordinates robot a, the horizontal member f moves up/down between a lower end position shown in FIG. 1 and an upper end position shown in FIG. 2, and the Z-axis member e, together with the rotating member c, rotates in the θ direction around the Z-axis. Thereby, the wafer handling unit g conveys the work w such as the semiconductor wafer to a predetermined position.

In some cases, in the manufacturing equipment, instead of the cylindrical coordinates robot a shown in FIGS. 1, 2, an articulated robot h shown in FIGS. 3, 4, as a general industrial robot is used. The articulated robot h is configured such that a wafer handling unit k is attached to a tip end of an arm j having a base end attached to a rotatable base unit i. The arm j has a plurality of joints m1, m2, m3 and is bendable. According to the configuration of the articulated robot h, the wafer handling unit k is displacable in Z-axis direction between an upper position shown in FIG. 3 and a lower position shown in FIG. 4 and is movable in a horizontal plane. Also, the arm j is displacable in θ direction around the Z-axis.

However, in the articulated robot h, if the arm j is bent by a large angle to reduce a length thereof in the Z-axis direction as shown in FIG. 4, that is, to lower the wafer handling unit k, a portion such as the joint m2, is greatly protruded from the base unit i in horizontal direction X and tends to interfere with its vicinity. For this reason, it is difficult to make the entire device using the articulated robot h compact.

In a clean room or a clean booth of which extremely high level cleanliness is demanded, air purifying equipment costs a great deal, and it is therefore necessary to minimize a foot print (foot area) of the manufacturing equipment in order to reduce a cost per unit area. Accordingly, most of respective devices in the manufacturing equipment are vertically provided, and the operation in the Z-axis direction of the robot for use in the manufacturing equipment is necessarily increased. Under the circumstance, the cylindrical coordinates robot a shown in FIGS. 1, 2, which does not significantly interfere with its vicinity and has a long stroke in the vertical direction, has been mainly used.

However, in the cylindrical coordinates robot a shown in FIGS. 1, 2, because a space for the Z-axis member e is required beside a space for the wafer handling unit g for conveying the work w in the Z-axis direction, an interferential space n is formed, as shown in a plan view of FIG. 5. This interferential space n impedes the device using the cylindrical coordinates robot a from being made compact, although it is smaller than an interferential space of the articulated robot h shown in FIGS. 3, 4.

When horizontally handling a disc-shaped work w such as the semiconductor wafer or a glass electrode for liquid crystal, there is a possibility that dust is generated from an upper portion of the Z-axis member e that is situated above the work w and falls on a surface of the work w and the work w is contaminated. For this reason, it is sometimes difficult to keep the demanded cleanliness of the work w.

Since the Z-axis member e have a length greater than that of a displacement stroke in the Z-axis direction of the wafer handling unit g of the horizontal member f, the member e is difficult to handle in installation or maintenance. For example, when carried into/out of the clean room, the long Z-axis member e must be handled as it is, which makes operation difficult. Also, when transferred from a manufacturing factory to a place where the member e is used, the Z-axis member e tends to be damaged and is bulky during transfer is reduced, because the long Z-axis member must be handled as it is.

By the way, as a horizontal movement mechanism of the wafer handling unit g, prior arts using a multistage slide mechanism, with higher space efficiency, are disclosed in Japanese Laid-Open Patent Publication No. Sho. 58-84435 (1983), Japanese Laid-Open Patent Publication No. Sho. 62-297085 (1987), Japanese Laid-Open Patent Publication No. Hei. 9-36200 (1997), and the like.

In these prior arts, up-down axes are moved in a horizontal direction. As a matter of course, these axes can be applied to vertical movement. However, since sliders in the respective stages are driven by combination of a rope and pulleys, it is not easy for the multistage slide mechanism to withstand excess weight including its own weight. When a highly rigid metal wire is used as the rope as a solution to the above problem, another problem that a holding force of the sliders is reduced because friction generated between the wire and the pulleys is small, will arise. Consequently, the configuration disclosed in each of the Publications, without being altered, cannot be applied to the cylindrical coordinates robot a.

Japanese Laid-Open Patent Publication No. Hei. 11-87461 (1999) discloses a substrate conveying device that holds a substrate and conveys the substrate to a predetermined position, comprising: a sweepable conveying arm that holds the substrate and conveys the substrate in the horizontal direction; a telescopic up-down mechanism that extends/retracts in the vertical direction to move the conveying arm up/down; and a cover provided such that it covers the telescopic up-down mechanism, extending/retracting in association with extension/retraction of the telescopic up-down mechanism, and having an opening in an upper face thereof.

However, in the device disclosed in the Japanese Laid-Open Patent Publication No. Hei. 11-87461 (1999), since the cover of the telescopic up-down mechanism is separated from the telescopic up-down mechanism, a foot print cannot be made sufficiently small. In addition, since this large cover, together with the telescopic up-down mechanism, extends/retracts during the extension/retraction of the telescopic up-down mechanism, air flow is greatly disordered, which tends to cause powder dust to swirl.

SUMMARY OF THE INVENTION

The present invention has been developed for obviating the above-described problems and an object of the present invention is to provide a robot comprising a telescopic-drive mechanism which does not contaminate works in a purified environment such as a clean room, is easy to handle, and requires no cover for covering the telescopic-drive mechanism.

According to an embodiment of the present invention, there is provided a robot comprising: an up-down axis in which a plurality of hollow axis sectional elements telescopically continue; and a telescopic-drive mechanism for driving the up-down axis to be vertically extended or retracted between an extended state in which a tip end of the up-down axis extends with respect to a base end thereof and a retracted state in which the tip end is moved close to the base end, wherein the telescopic-drive mechanism is integrated on one side of the up-down axis without being exposed from the up-down axis.

According to another embodiment of the present invention, there is provided a robot comprising: an up-down axis in which a plurality of hollow axis sectional elements telescopically continue; a telescopic-drive mechanism for driving the up-down axis to be vertically extended or retracted between an extended state in which a tip end of the up-down axis extends with respect to a base end thereof and a retracted state in which the tip end is moved close to the base end; and an operation axis unit having a rotatable base provided at a top portion of the up-down axis, wherein the telescopic-drive mechanism is integrated on one side of the up-down axis without being exposed from the up-down axis.

It is preferable that the robot comprises an exhaust means provided at a lower end portion of the up-down axis, for exhausting a gas inside of the up-down axis, or an exhaust duct provided at the lower end portion of the up-down axis such that the exhaust duct communicates with the interior of the up-down axis, thereby making an interior of the up-down axis have a negative pressure.

In the robot of the present invention, the telescopic-drive mechanism is structured such that the up-down axis comprises: a main up-down means for moving a second axis sectional element up or down with respect to a first axis sectional element situated at the base end, the second axis sectional element being situated above the first axis sectional element; and a subordinate up-down means for moving remaining axis sectional elements other than the second axis sectional element up or down, following up movement or down movement of the second axis sectional element. In this case, it is preferable that the up-down axis has a substantially rectangular cross section and the main up-down means and the subordinate up-down means are provided on a side face of a long side of the rectangular cross section of the up-down axis.

It is preferable that the main up-down means comprises a ball screwing mechanism. The subordinate up-down means comprises: a band-shaped or line-shaped drive member having flexibility; and a rotating member, and the rotating member is rotatably mounted to an upper end portion of a storage portion of an intermediate axis sectional element, the drive member is installed around the rotating member, and the drive member has a lower end portion attached to a lower axis sectional element and an upper end portion attached to an upper axis sectional element. In this case, it is preferable that a plurality of drive members are installed in parallel around the rotating member.

Also, it is preferable that the robot of the present invention comprises: a guide portion for guiding up movement or down movement of the plurality of axis sectional elements driven by the main up-down means and the subordinate up-down means and is more preferable that the guide portion is provided adjacently to the subordinate up-down means.

In the robot of the present invention, the telescopic-drive mechanism for extending/retracting the axis sectional elements is integrated on one side of the up-down axis without being exposed therefrom, the powder dust generated as a result of operation of the telescopic-drive mechanism is prevented from flying to all directions in the clean room, and simultaneously, the configuration of the robot can be simplified.

In addition, since transfer and installation can be carried out with the robot retracted, space efficiency in transfer is improved and complexity of installation operation is avoided. Correspondingly, a transfer cost and an installation cost are reduced.

Further, according to still another preferred embodiment of the present invention, since the operation axis unit is rotatably provided at the top portion of the up-down axis, the foot area in equipment which the robot occupies becomes substantially as small as a bottom area of the first axis sectional element at the base end, and therefore, the equipment can be easily made compact. Moreover, since the operation axis unit is positioned at the highest position, the work such as the wafer is prevented from being contaminated by the power dust caused by the operation of the operation axis unit.

The above and further objects and features of the invention will more fully be apparent from the following detailed description with accompanying drawings.

DETAILED DESCRIPTION OF THE PREFERRED EMBODIMENTS

Hereinafter, preferred embodiments will be described with reference to accompanying drawings, although the present invention is not limited to the embodiment.

Figure 1:
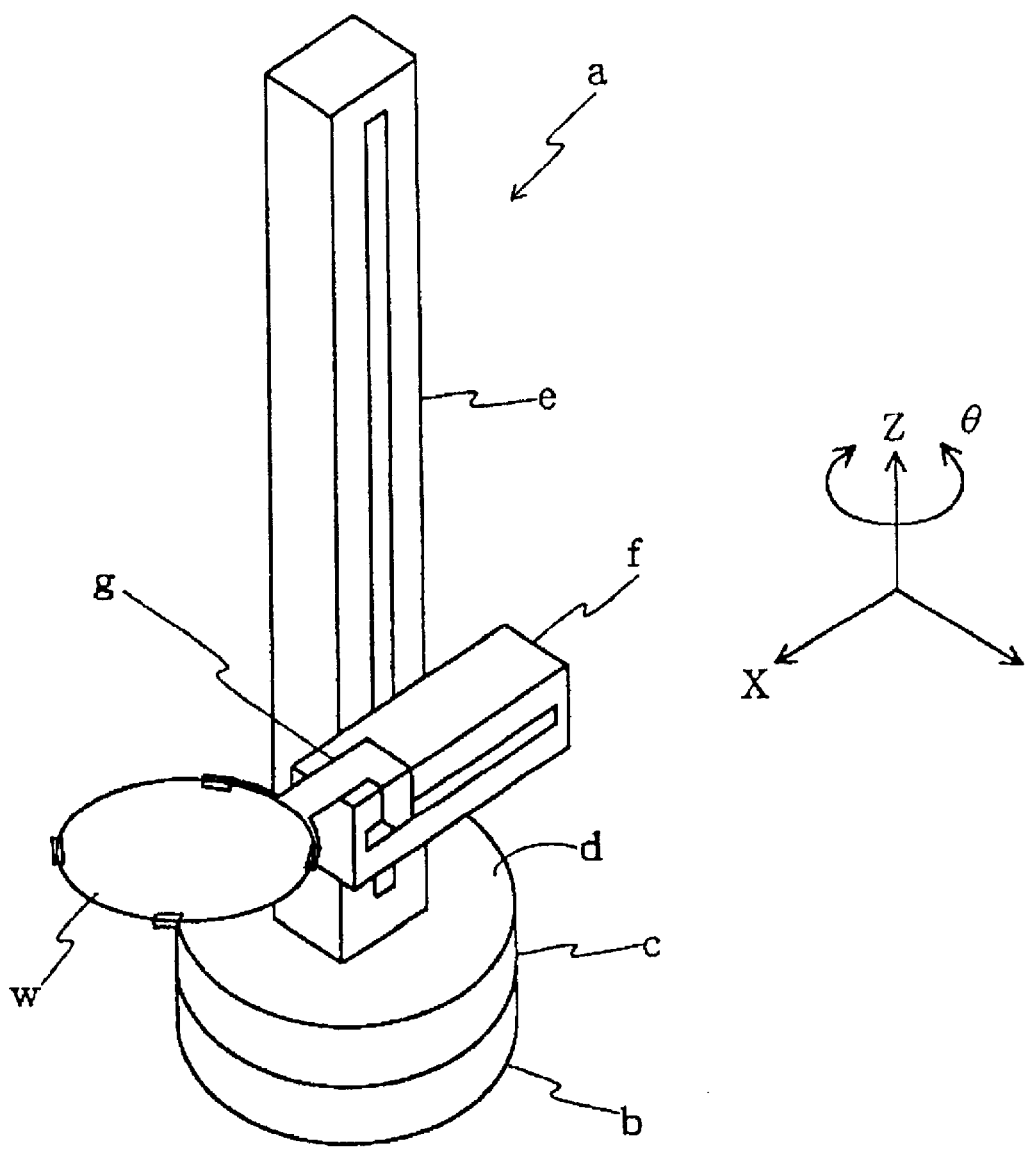
FIG. 1 is a perspective view showing the conventional cylindrical coordinates robot and showing a state in which a wafer handling unit is positioned at a lower end position.
Figure 2:
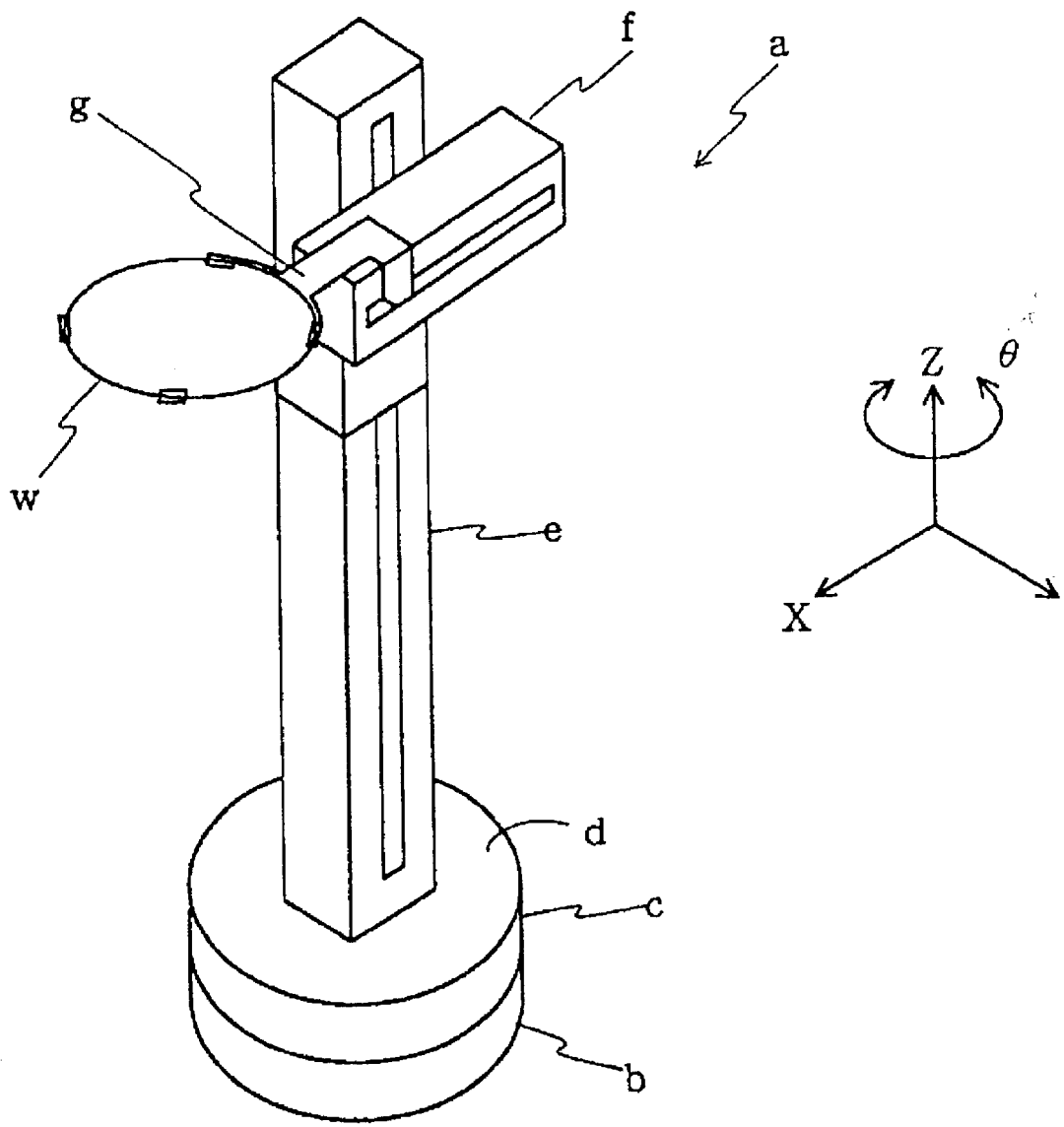
FIG. 2 is a perspective view showing the conventional cylindrical coordinates robot and showing a state in which the wafer handling unit is positioned at an upper end position.
Figure 3:
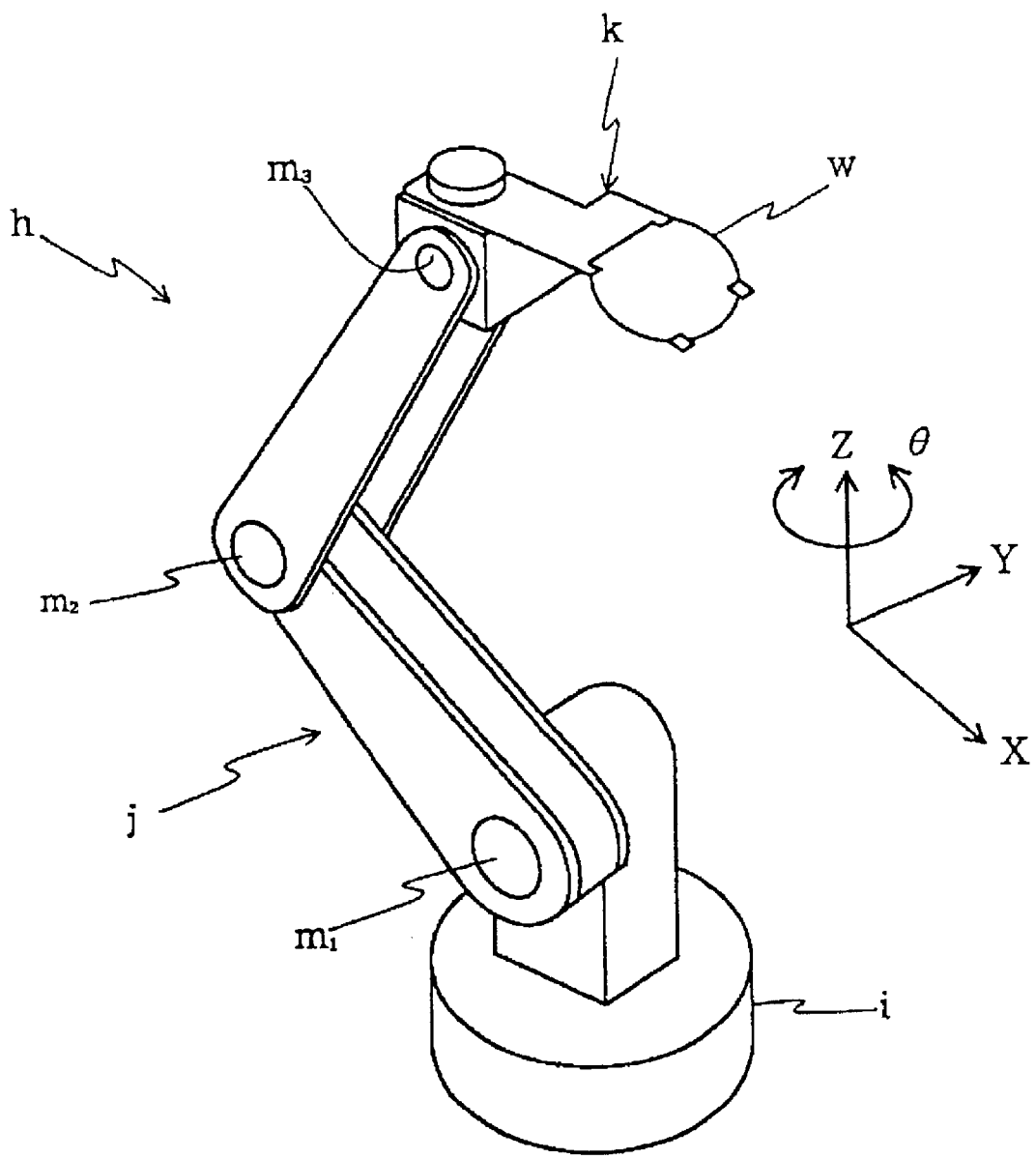
FIG. 3 is a perspective view showing the conventional articulated robot and showing a sate in which a wafer handling unit is positioned at an upper end position.
Figure 4:
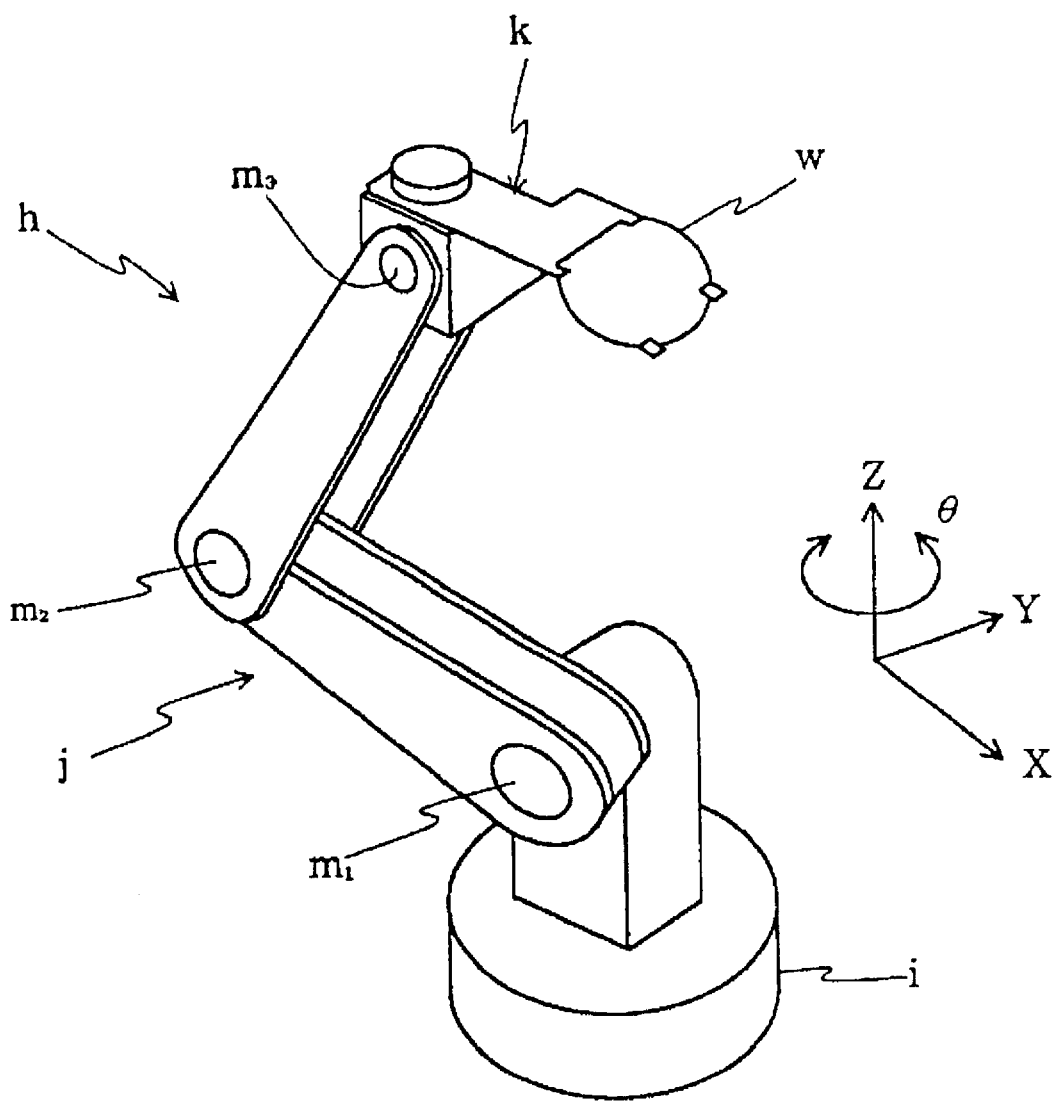
FIG. 4 is a perspective view showing the conventional articulated robot and showing a sate in which the wafer handling unit is positioned at a lower end position.
Figure 5:
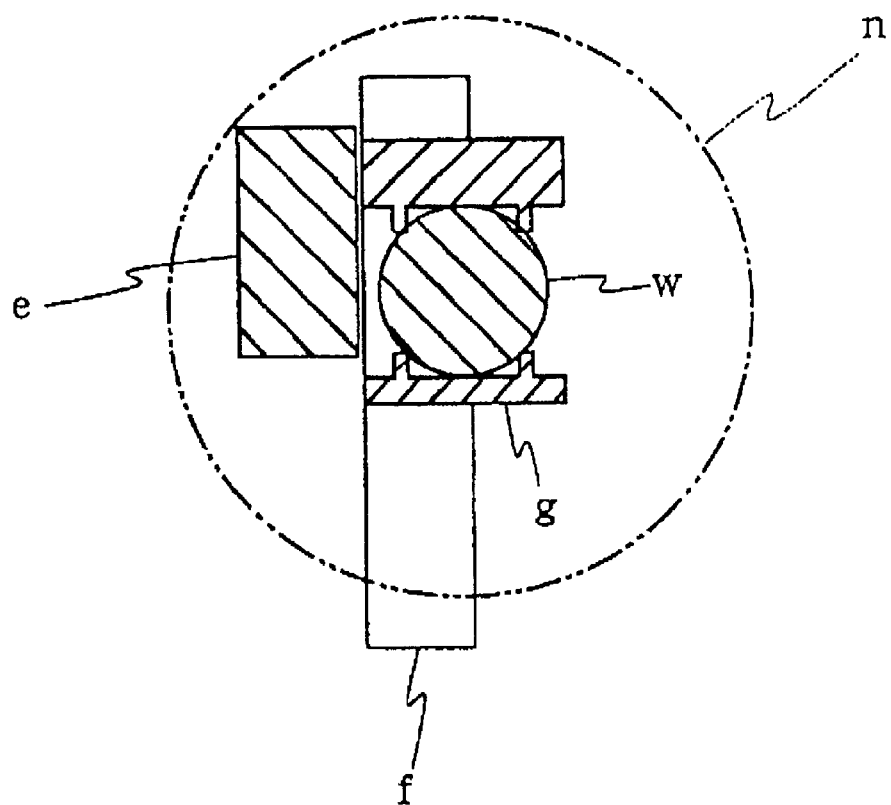
FIG. 5 is a plan view showing an interferential space of the conventional cylindrical coordinates robot.
Figure 6:
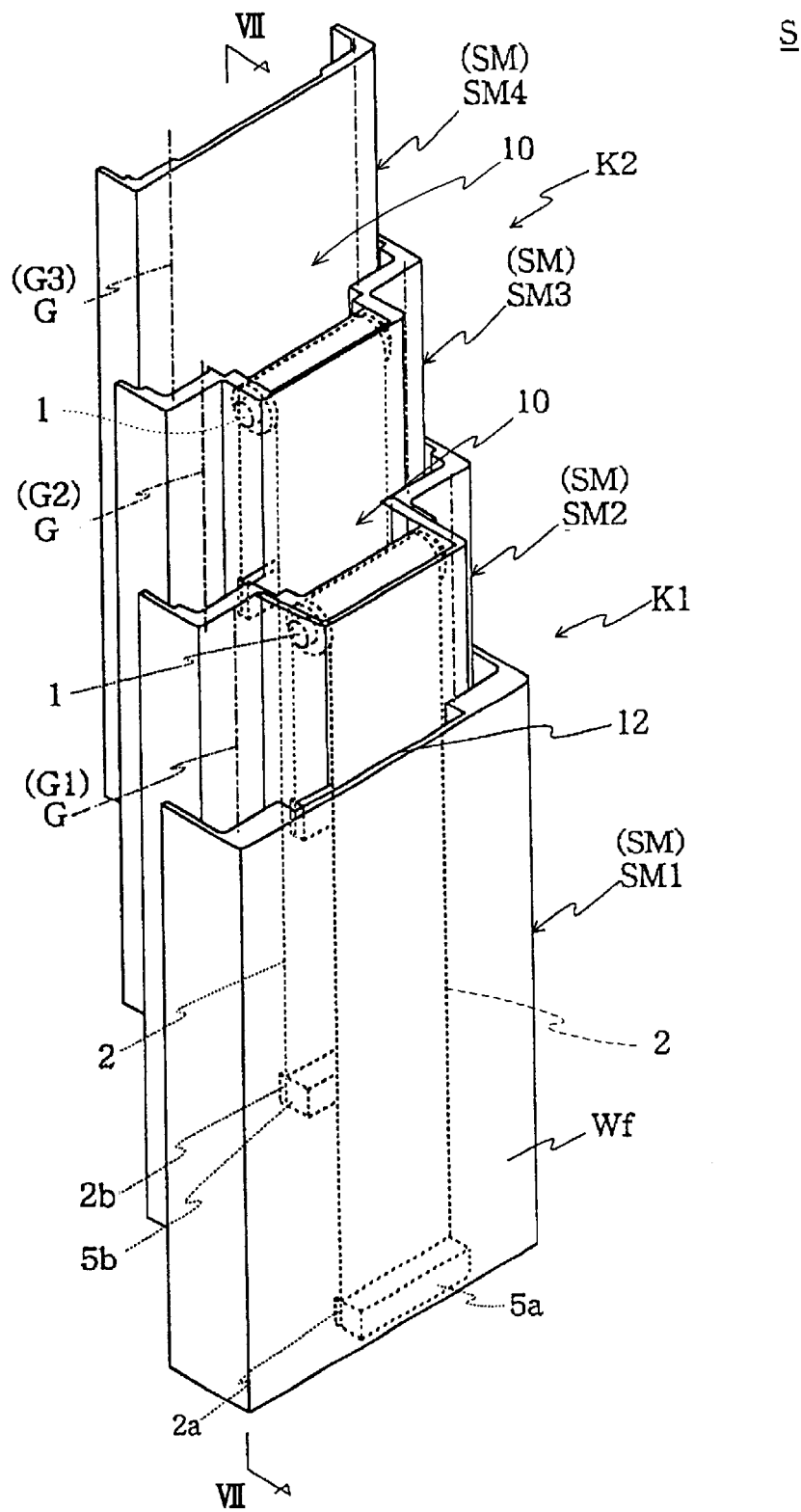
FIG. 6 is a perspective view schematically showing a subordinate up-down mechanism employed in a robot of the present invention.
Figure 7:
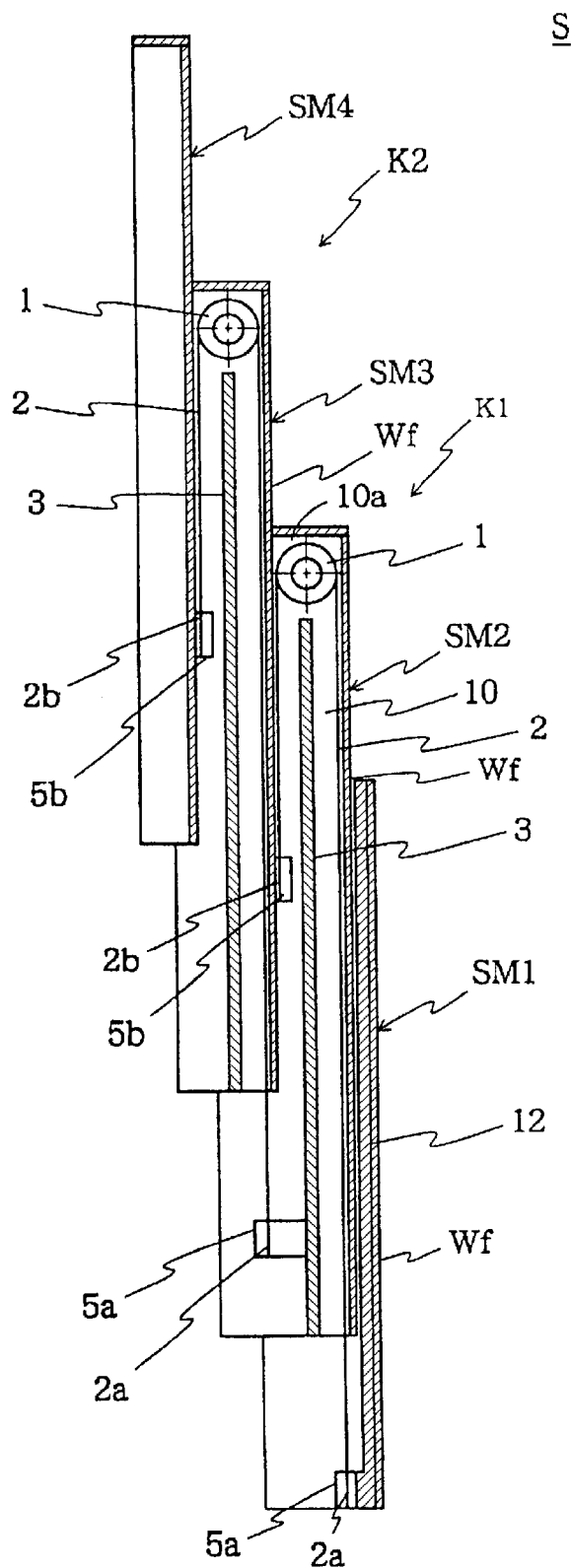
FIG. 7 is a cross-sectional view taken along line VII—VII in FIG. 6.

FIG. 6 is a perspective view schematically showing main portions of a subordinate up-down mechanism (subordinate up-down means) S which is employed in a telescopic robot (hereinafter referred to as a robot) according to an embodiment of the present invention and FIG. 7 is a cross-sectional view taken along line VII—VII in FIG. 6. In the example shown in these Figures, the subordinate up-down mechanism S is adapted to move a first axis sectional element SM1, a second axis sectional element SM2, a third axis sectional element SM3, and a fourth axis sectional element SM4, up/down in association with a main up-down mechanism (main up-down means). The first to fourth axis sectional elements SM1–SM4 are telescopically placed in a vertical direction. The elements SM1–SM4 respectively have substantially channel shaped cross sections. The elements SM1–SM4 are arranged in the same direction such that these elements respectively surround their adjacent elements in this order, that is, these elements respectively overlap with their adjacent elements in this order as having a predetermined clearance. The fourth axis sectional element SM4 has a lower end portion fixed to a base (not shown). The third axis sectional element SM3, the second axis sectional element SM2, and the first axis sectional element SM1 are upwardly extended in this order from the fourth axis sectional element SM4.

Specifically, the subordinate up-down mechanism S comprises a first subordinate up-down portion K1 for moving the third axis sectional element SM3 up/down, following the up/down movement of the second axis sectional element SM2 driven by a main up-down mechanism mentioned in detail later, a second subordinate up-down portion K2 for moving the fourth axis sectional element SM4 up/down, following the up/down movement of the third axis sectional element SM3 driven by the first subordinate up-down portion K1, and a guide portion G for guiding the up/down movement by the first and second subordinate up-down portions K1, K2. The first subordinate up-down portion K1 and the second subordinate up-down portion K2 are provided on the same side of the axis sectional elements SM, for example, on a front face side (on a front and right side of FIG. 6). In other words, the first subordinate up-down portion K1 and the second subordinate up-down portion K2 are integrated on one side of the axis sectional elements SM.

The first subordinate up-down portion K1 comprises an up-down roller 1, a drive belt 2 installed around the up-down roller 1, and a separating plate 3, and its main portion is stored in a storage portion 10 of the second axis sectional element SM2. To store the storage portion 10, the first axis sectional element SM1 is provided with a storage concave portion 12 formed in a corresponding inner face of a front wall Wf.

Figure 8A:
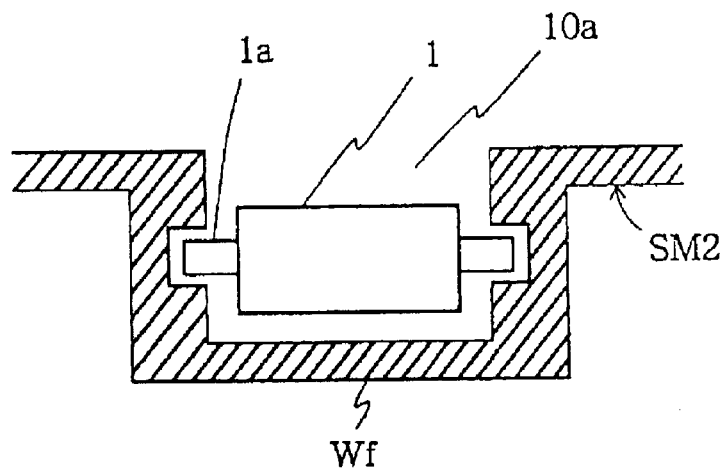
FIG. 8A is an enlarged sectional plan view showing main portions of the subordinate up-down mechanism shown in FIGS. 6, 7.
Figure 8B:
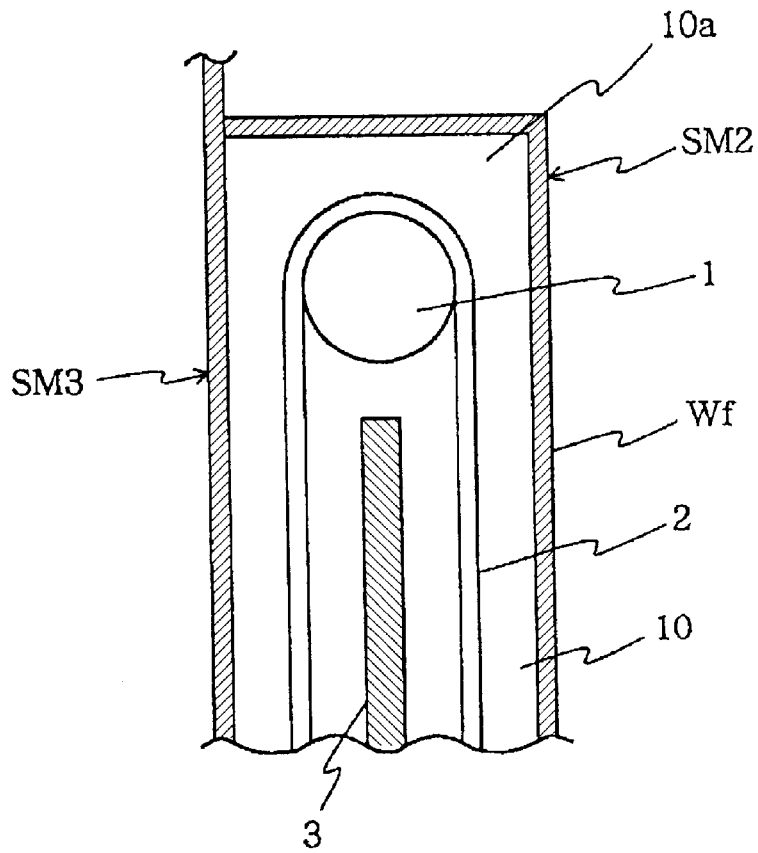
FIG. 8B is an enlarged sectional side view showing main portions of the subordinate up-down mechanism shown in FIGS. 6, 7.

More specifically, the up-down roller 1 has a rotating shaft 1a rotatably attached to a side wall of the storage portion 10, in an upper end portion 10a of the storage portion 10 formed by protruding a central portion of the front wall Wf of the second axis sectional element SM2 from an upper end thereof to a lower end thereof in a direction toward a front face (see FIG. 8A). In this case, the vertical position at which the up-down roller 1 is provided is adjusted so that the drive belt 2 installed on a top portion thereof is not protruded from an upper end of the second axis sectional element SM2 (see FIG. 8B). An end portion of the rotational shaft 1a of the roller 1 is not exposed, that is, the end portion of the rotational shaft 1a is stored in a side wall of the storage portion 10 (see FIG. 8A). In FIG. 8A, for the sake of convenience, a clearance between the rotational shaft 1a and the side wall is enlarged.

Figure 9:
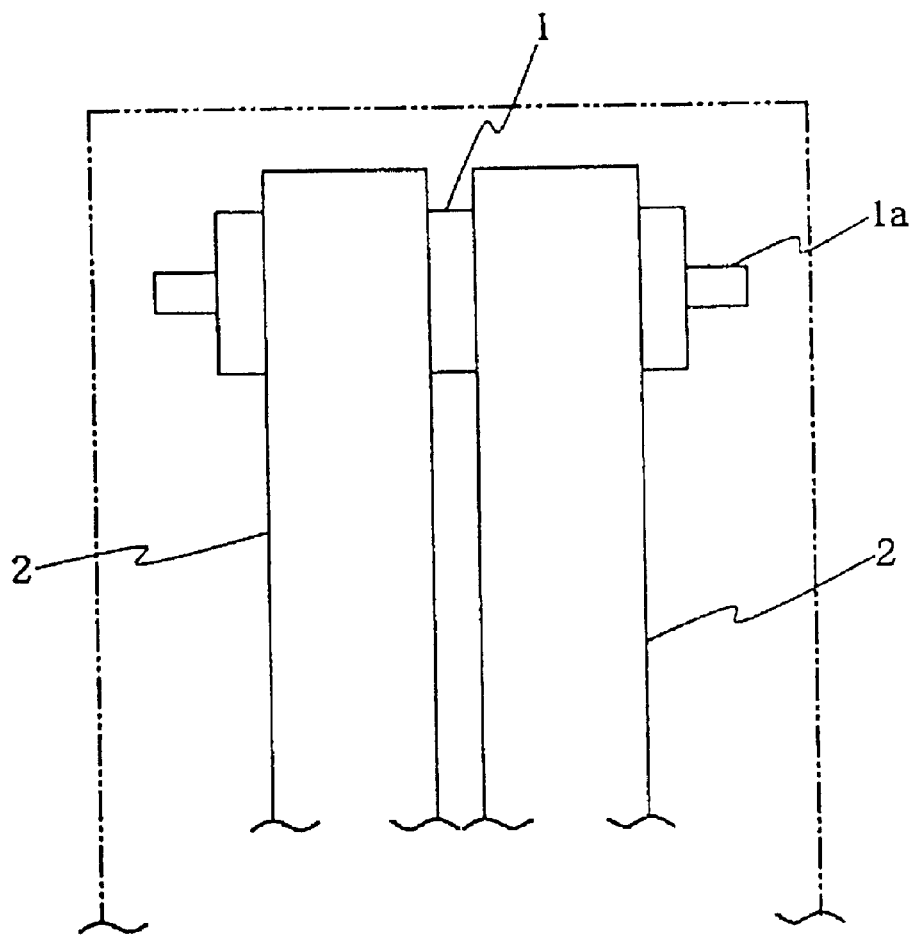
FIG. 9 is a schematic view showing a state in which drive belts are installed in parallel around an up-down roller in the subordinate up-down mechanism shown in FIGS. 6, 7.

The drive belt 2 installed around the up-down roller 1 is, for example, made of a stainless band steel or a wire having predetermined strength and flexibility. One end portion lower end portion) 2a of the drive belt 2 is downwardly extended along the inner face of the front wall Wf of the second axis sectional element SM2 and fixed to a lower end portion of the inner face of the front wall Wf of the first axis sectional element SM1 by means of a mounting member 5a. The other end portion (upper end portion) 2b of the drive belt 2 is fixed to a predetermined portion of an outer face of the front wall Wf of the third axis sectional element SM3 by means of a mounting member 5b. The position of the predetermined portion is adjusted to allow the third axis sectional element SM3 be moved up/down by a predetermined distance when the second axis sectional element SM2 is moved up/down by the main up-down mechanism. While the number of the drive belt 2 is one in the illustrated example, it is preferable that a plurality of belts are provided as shown in FIG. 9. This is because, when the plurality of belts 2 are provided, maintenance of the drive belts 2 can be alternately performed and a jig for keeping the position of the axis sectional element SM in maintenance of the drive belt 2 can be dispensed with.

The separating plate 3 has a width substantially equal to an inner dimension of the storage portion 10 and a length from below of the up-down roller 1 to a lower end of the second axis sectional element SM2. The separating plate 3 is provided between two portions of the drive belt 2 installed around the up-down roller 1. More specifically, the separating plate 3 is provided immediately below the up-down roller 1 so that moment due to load (vertically and downwardly) applied on the up-down roller 1 is not applied on the separating plate 3. The separating plate 3 is a rigid member that is sufficiently rigid not to be elastically deformed by the moment and rigid enough to withstand a force applied to an end portion of the drive belt 2 of the second subordinate up-down portion K2 mentioned later.

As should be appreciated from the foregoing description, the up-down roller 1, the drive belt 2, and the separating plate 3 constituting the first subordinate up-down portion K1 are not exposed.

The front wall Wf of the axis sectional element SM may be a removably attachable cover, for easy maintenance.

Like the first subordinate up-down portion K1, the second subordinate up-down portion K2 comprises an up-down roller 1, a drive belt 2 installed around the up-down roller 1, and a separating plate 3, and its main portion is stored in a storage portion 10 of the third axis sectional element SM3.

More specifically, the up-down roller 1 has a rotating shaft 1*a* rotatably attached to a side wall of the storage portion 10, in an upper end portion 10*a* of the storage portion 10 formed by protruding a central portion of the front wall Wf of the third axis sectional element SM3 from an upper end thereof to a lower end thereof in a direction toward a front face (see FIG. 8A). In this case, the vertical position at which the up-down roller 1 is provided is adjusted so that the drive belt 2 installed on a top portion thereof is not protruded from an upper end of the third axis sectional element SM3 (see FIG. 8B). An end portion of the rotational shaft 1*a* of the roller 1 is not exposed, that is, the end portion of the rotational shaft 1*a* is stored in a side wall of the storage portion 10 (see FIG. 8A).

One end portion (lower end portion) 2*a* of the drive belt 2 installed around the up-down roller 1 is downwardly extended along an inner face of the front wall Wf of the third axis sectional element SM3 and fixed to a predetermined portion of a lower portion of an inner face of the separating plate 3 provided in the second axis sectional element SM2 by means of the mounting member 5*a*, and the other end portion (upper end portion) 2*b* thereof is fixed to a predetermined portion of an outer face of the front wall Wf of the fourth axis sectional element SM4 by means of the mounting member 5*b*. The positions of these predetermined portions are adjusted so that the fourth axis sectional element SM4 can be moved up/down by a predetermined distance when the third axis sectional element SM3 is moved up/down by the first subordinate up-down portion K1.

The separating plate 3 has a width substantially equal to a inner dimension of the storage portion 10 and a length from below of the up-down roller 1 to a lower end of the third axis sectional element SM3. The separating plate 3 is provided between two portions of the drive belt 2 installed around the up-down roller 1.

As should be appreciated from the foregoing description, the up-down roller 1, the drive belt 2, and the separating plate 3 constituting the second subordinate up-down portion K2 are not exposed.

As shown in FIG. 6, the guide portion G comprises a first guide portion G1 for guiding up-down movement of the second axis sectional element SM2, a second guide portion G2 for guiding up-down movement of the third axis sectional element SM3, and a third guide portion G3 for guiding up-down movement of the four axis sectional element SM4. Since the first guide portion G1, the second guide portion G2, and the third guide portion G3 have the same structure, hereinbelow, a structure of the first guide portion G1 will be described with reference to FIG. 10.

Figure 10:
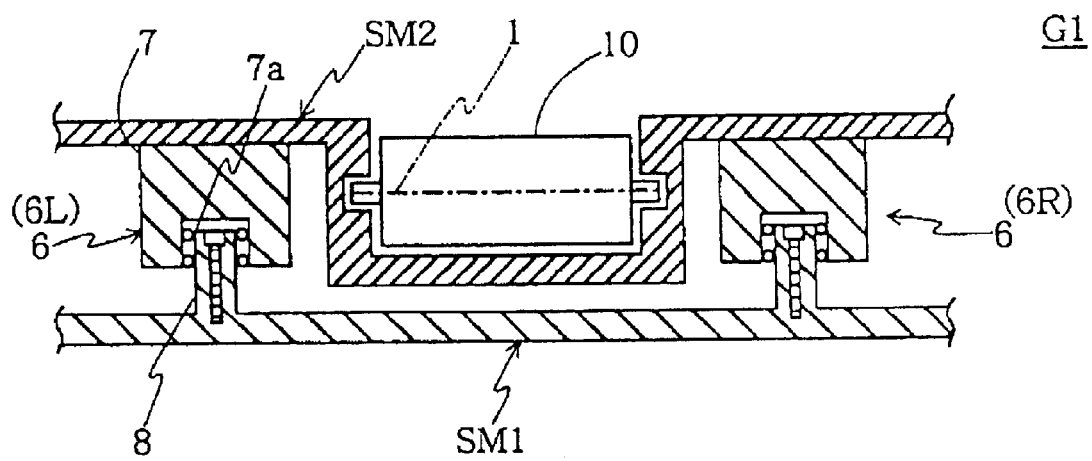
FIG. 10 is a schematic view showing a first guide portion of the subordinate up-down mechanism shown in FIGS. 6, 7.

As shown in FIG. 10, the first guide portion G1 is constituted by a pair of guide mechanisms 6 (a right guide mechanism 6R and a left guide mechanism 6L), which are provided such that the storage portion 10 is interposed between them, adjacently to the storage portion 10, and symmetrically with respect to the storage portion 10 in a width direction thereof. The right guide mechanism 6R and the left guide mechanism 6L are each constituted by a guide member 7 vertically provided along an outer face of the second axis sectional element SM2 and having a guide groove 7*a* formed in a front face thereof, and a slide member 8 vertically provided at a portion of the inner face of the first axis sectional element SM1, which is associated with the guide member 7, for being slidably fitted into the guide groove 7*a*.

Although the pair of the guide mechanisms 6 of the guide portion G are placed symmetrically in the illustrated example, the configuration of the guide portion G is not limited to this.

Figure 11:
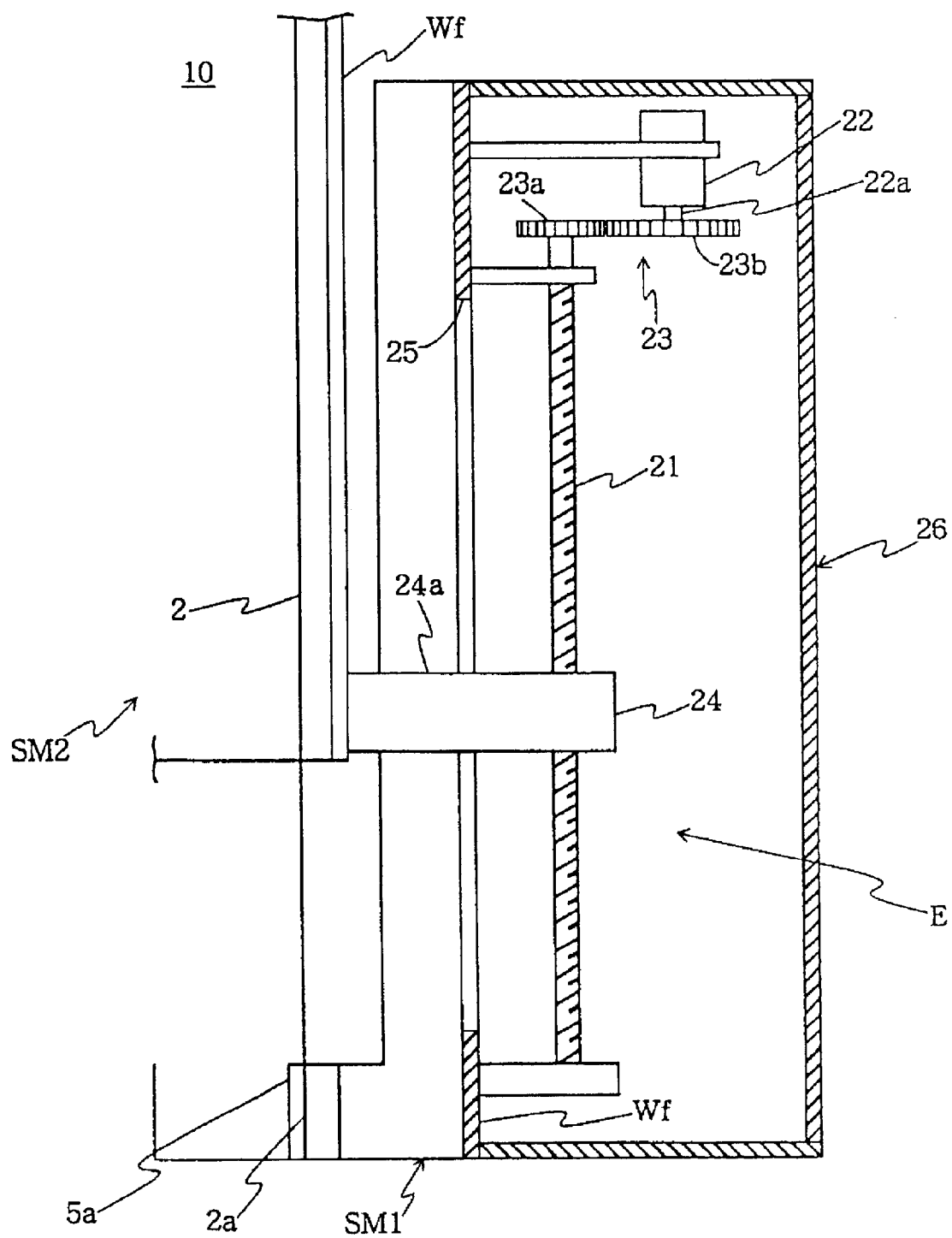
FIG. 11 is a schematic view showing a main up-down mechanism employed in the robot of the present invention.

As shown in FIG. 11, the main up-down mechanism E comprises a screw shaft 21 for up-down movement, a drive motor 22, a gear mechanism 23 for transmitting a driving force of the drive motor 22 to the screw shaft 21, and an up-down block 24 screwed on the screw shaft 21 for being moved up/down. The mechanism for transmitting the driving force is not limited to the gear mechanism 23, and may be one of various types of power transmission mechanisms. For example, a belt mechanism may be employed.

The screw shaft 21 may be, for example, a ball screw shaft. The screw shaft 21 is vertically and rotatably provided such that it is spaced a predetermined distance apart from the front wall Wf of the first axis sectional element SM1, for example, it is situated at a position associated with the storage portion 10 of the second axis sectional element SM2. An output gear 23*a* of the gear mechanism 23 is attached to an upper end of the screw shaft 21.

The drive motor 22 is provided closer to the upper end of the screw shaft 21 and in parallel with the screw shaft 21 such that the up-down shaft 22*a* is directed downwardly. An input gear 23*b* of the gear mechanism 23 is attached to a tip end portion of the up-down shaft 22*a*.

The up-down block 24 has a base end portion 24*a* penetrating through a window 25 for up-down movement provided at a portion of the first axis sectional element SM1, which corresponds to a vertical length of the screw shaft 21, is provided and joined to a predetermined portion of a lower end portion of the front wall Wf forming the storage portion 10 of the second axis sectional element SM2.

The main up-down mechanism E is configured as described above. In this configuration, when the drive motor 22 is driven, the resulting driving force is transmitted to the screw shaft 21 via the gear mechanism 23 and causes the screw shaft 21 to be rotated, thereby moving the up-down block 24 up/down along the screw shaft 21. Since the base end portion 24*a* of the up-down block 24 is joined to the second axis sectional element SM2, the second axis sectional element SM2 is moved up/down, along with the up/down movement of the up-down block 24.

As shown in FIG. 11, the main up-down mechanism E so configured is covered by a casing 26 for storing the main up-down mechanism E.

Subsequently, the up-down movement of the subordinate up-down mechanism S having the above configuration will be described.

When the second axis sectional element SM2 is moved up by the main up-down mechanism E, the upper end 2*b* of the drive belt 2 is pulled up by the up movement of the second axis sectional element SM2 because the lower end 2*a* of the drive belt 2 is fixed to the inner face of the lower end portion of the first axis sectional element SM1. Also, since the upper end 2*b* of the drive belt 2 is fixed to the outer face of the third axis sectional element SM3, the upper end 2*b* pulls up the third axis sectional element SM3. In other words, the second axis sectional element SM2, the first axis sectional element SM1, and the third axis sectional element SM3, respectively correspond to an intermediate axis sectional element, a lower axis sectional element, and an upper axis sectional element, and relative to the intermediate axis sectional element, the upper axis sectional element is moved up and the lower axis sectional element is moved down.

When the third axis sectional element SM3 is pulled up, the upper end 2*b* of the drive belt 2 is correspondingly pulled up. Also, since the upper end 2b of the drive belt 2 is fixed to the fourth axis sectional element SM4, the upper end 2b pulls up the fourth axis sectional element SM4. In other words, the third axis sectional element SM3, the second axis sectional element SM2, and the fourth axis sectional element SM4, respectively correspond to an intermediate axis sectional element, a lower axis sectional element, and an upper axis sectional element, and relative to the intermediate axis sectional element, the upper axis sectional element is moved up and the lower axis sectional element is moved down.

Thus, the second axis sectional element SM2 to the fourth axis sectional element SM4 are telescopically advanced. Since this advancement is guided by the guide portion G, i.e., the first guide portion G1, the second guide portion G2, and the third guide portion G3, the axis sectional elements SM2, SM3, SM4 do not waggle rightward or leftward while they are advanced.

On the other hand, when the second axis sectional element SM2 is moved down by the main up-down mechanism E, the upper end 2b of the drive belt 2 is pulled down by the down movement of the second axis sectional element SM2 since the lower end 2a of the drive belt 2 is fixed to the inner face of the lower end portion of the first axis driving element SM1. Also, since the upper end 2b of the drive belt 2 is fixed to the outer face of the third axis sectional element SM3, the upper end 2b pulls down the third axis sectional element SM3. When the third axis sectional element SM3 is pulled down, the upper end 2b of the drive belt 2 is correspondingly pulled down. Since the upper end 2b of the drive belt 2 is fixed to the fourth axis sectional element SM4, the upper end 2b pulls down the fourth axis sectional element SM4. Thus, the second axis sectional element SM2 to the fourth axis sectional element SM4 are telescopically retracted. Since this retraction is guided by the guide portion G1, i.e., the first guide portion G1, the second guide portion G2, and the third guide portion G3, the axis sectional elements SM2, SM3, SM4 do not waggle rightward or leftward during retraction.

Subsequently, a robot comprising the telescopic-drive mechanism constituted by the main up-down mechanism E and the subordinate up-down mechanism S so configured, will be described.

Figure 12:
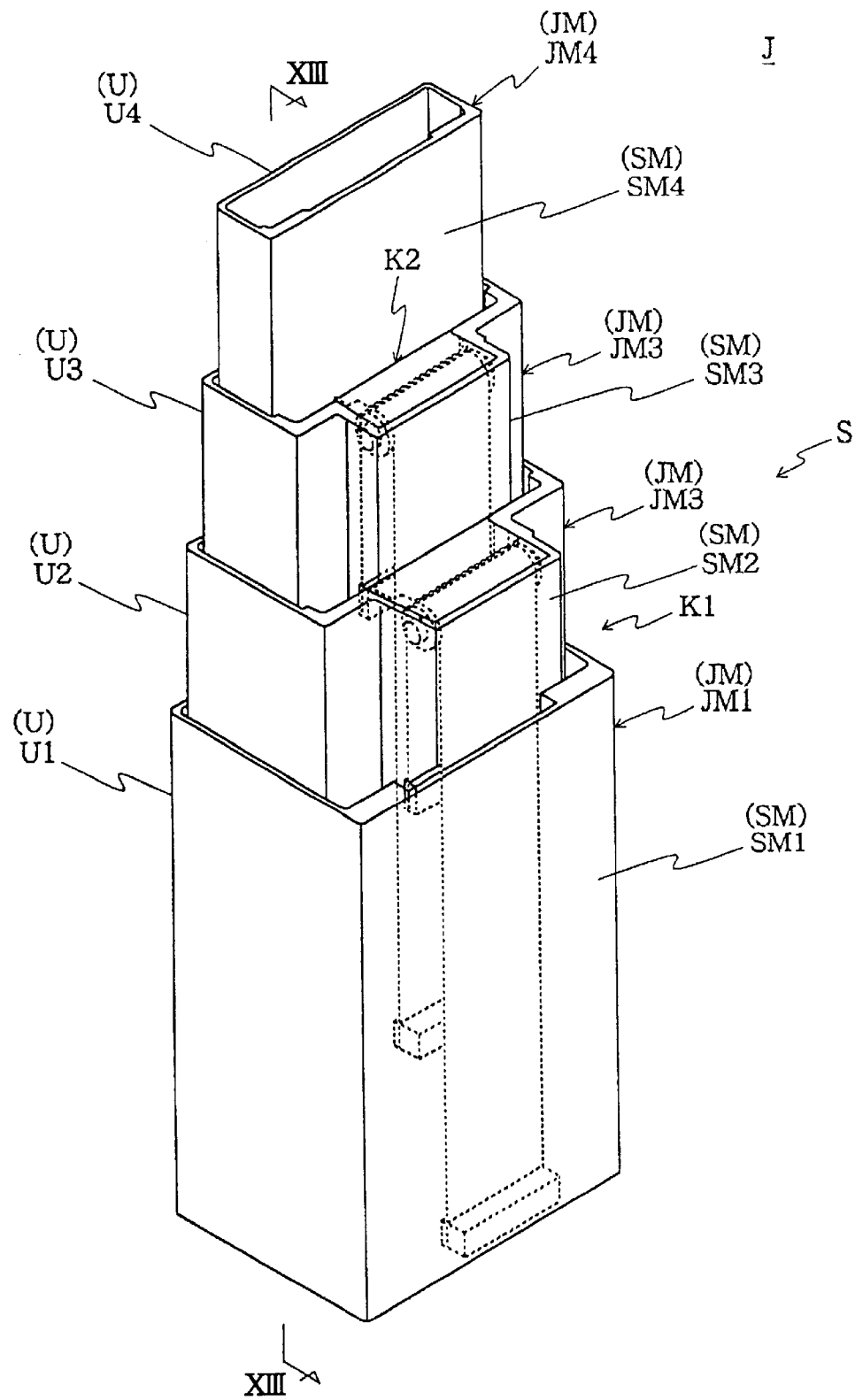
FIG. 12 is a perspective view schematically showing an up-down axis of the robot of the present invention.
Figure 13:
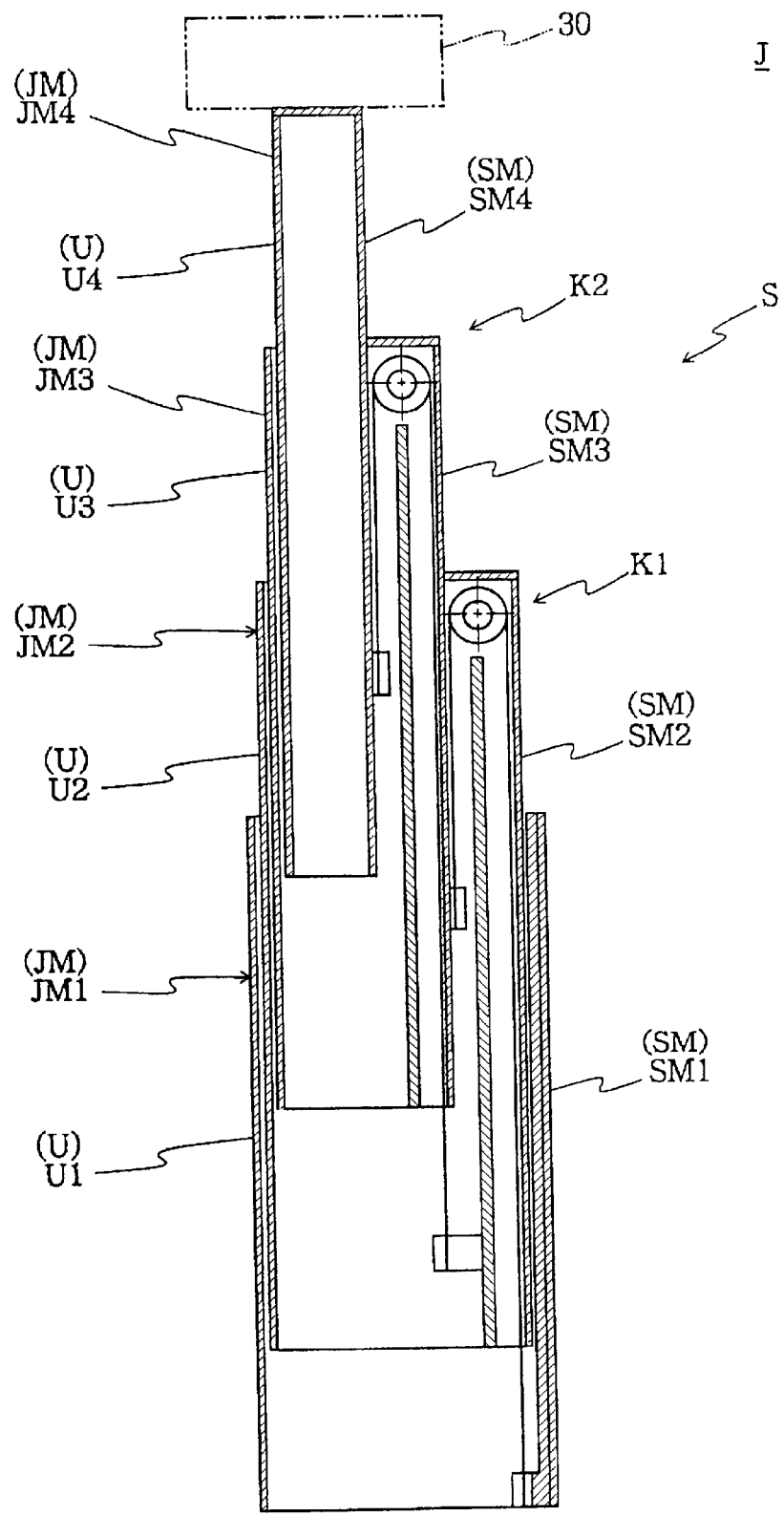
FIG. 13 is a cross-sectional view taken along line XIII—XIII in FIG. 12.

FIG. 12 is a perspective view schematically showing an up-down axis J of the robot with constituents except the subordinate up-down mechanism S omitted and FIG. 13 is a cross-sectional view taken along line XIII—XIII in FIG. 12.

As shown in FIGS. 12, 13, the up-down axis J is structured such that a channel-shaped member U is placed opposite to the substantially channel-shaped axis sectional element SM and a tip end portion of the channel-shaped axis sectional element SM and a tip end portion of the channel-shaped member U are joined and united to form an axis sectional element JM having a substantially rectangular cross section. Each axis sectional element JM is telescopically movable up/down. More specifically, the first axis sectional element SM1 and a channel-shaped member U1 are joined and united to form a hollow-column shaped first axis sectional element JM1 having a substantially rectangular cross section. Provided inside of the first axis sectional element JM1 is a hollow-column shaped second axis sectional element JM2 having a substantially cross section which is formed by joining and uniting the second axis sectional element SM2 and a channel-shaped member U2. Provided inside of the second axis sectional element JM2 is a hollow-column shaped third axis sectional element JM3 having a substantially cross section which is formed by joining and uniting the third axis sectional element SM3 and a channel-shaped member U3. Provided inside of the third axis sectional element JM3 is a hollow-column shaped fourth axis sectional element JM4 having a substantially cross section which is formed by joining and uniting the fourth axis sectional element SM4 and a channel-shaped member U4. Thus, the entire up-down axis J is telescopically extensible/retractable. In this case, the main up-down mechanism E and the subordinate up-down mechanism S constituting the telescopic-drive mechanism are integrated on a long side of a rectangle of the rectangular cross section.

Figure 14:
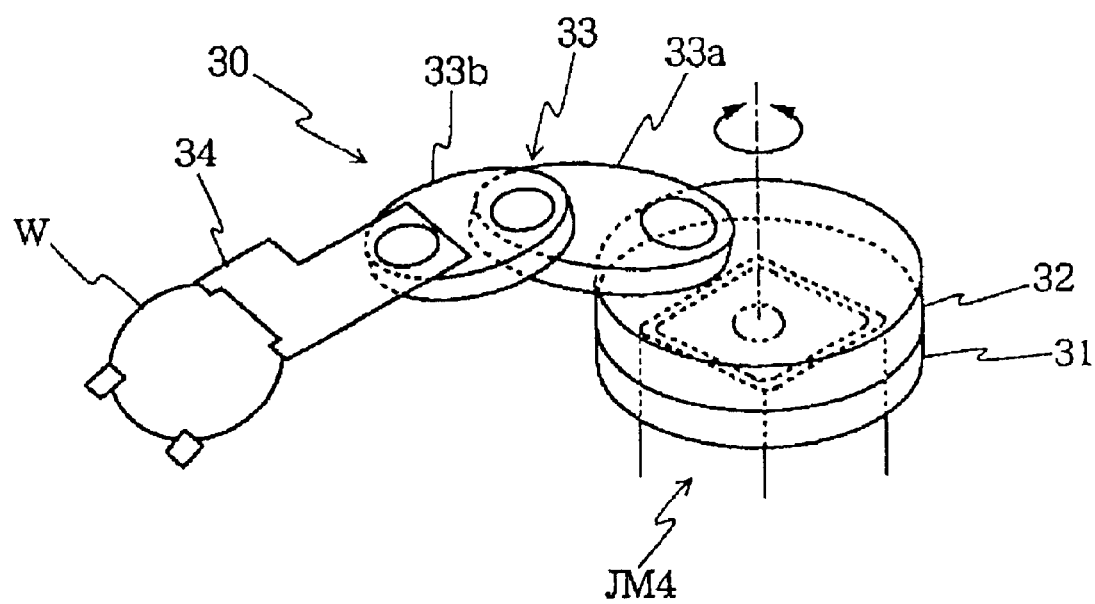
FIG. 14 is a perspective view schematically showing an operation axis unit of the robot of the present invention.

As shown in FIG. 14, an operation axis unit 30 is provided at a top portion of the up-down axis J, i.e., at a tip end of the fourth axis sectional element JM4.

The operation axis unit 30 comprises a circular disc shaped unit base 31 attached to the tip end portion of the fourth axis sectional element JM4, a turn table 32 rotatably placed on the unit base 31, an arm 33 attached to the turn table 32 at a suitable position, and a wafer handling unit 34 attached to an upper face of a tip end portion of the arm 33. The conventionally known rotating mechanism may be suitably used as a rotating mechanism of the turn table 32 and the conventionally known handling unit may be also used as the wafer handling unit 34. The arm 33 is constituted by a first arm 33a having a base end portion rotatably attached to the turn table 32 at a suitable position and a second arm 33b rotatably attached to the upper face of the first arm 33a. In FIG. 14, reference numeral W denotes a work such as a wafer.

Figure 15:
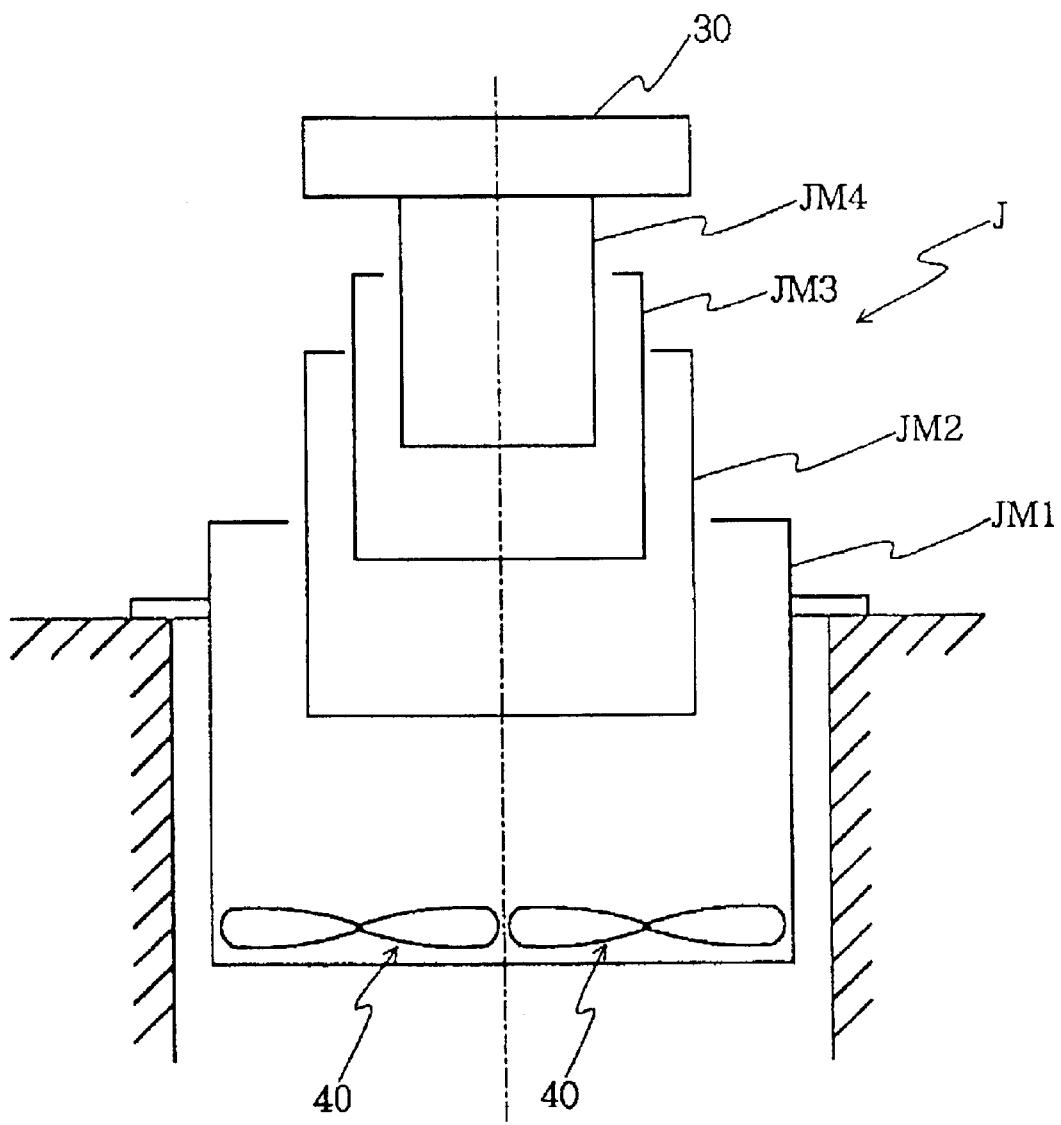
FIG. 15 is a schematic view showing the robot of the present invention.
Figure 16:
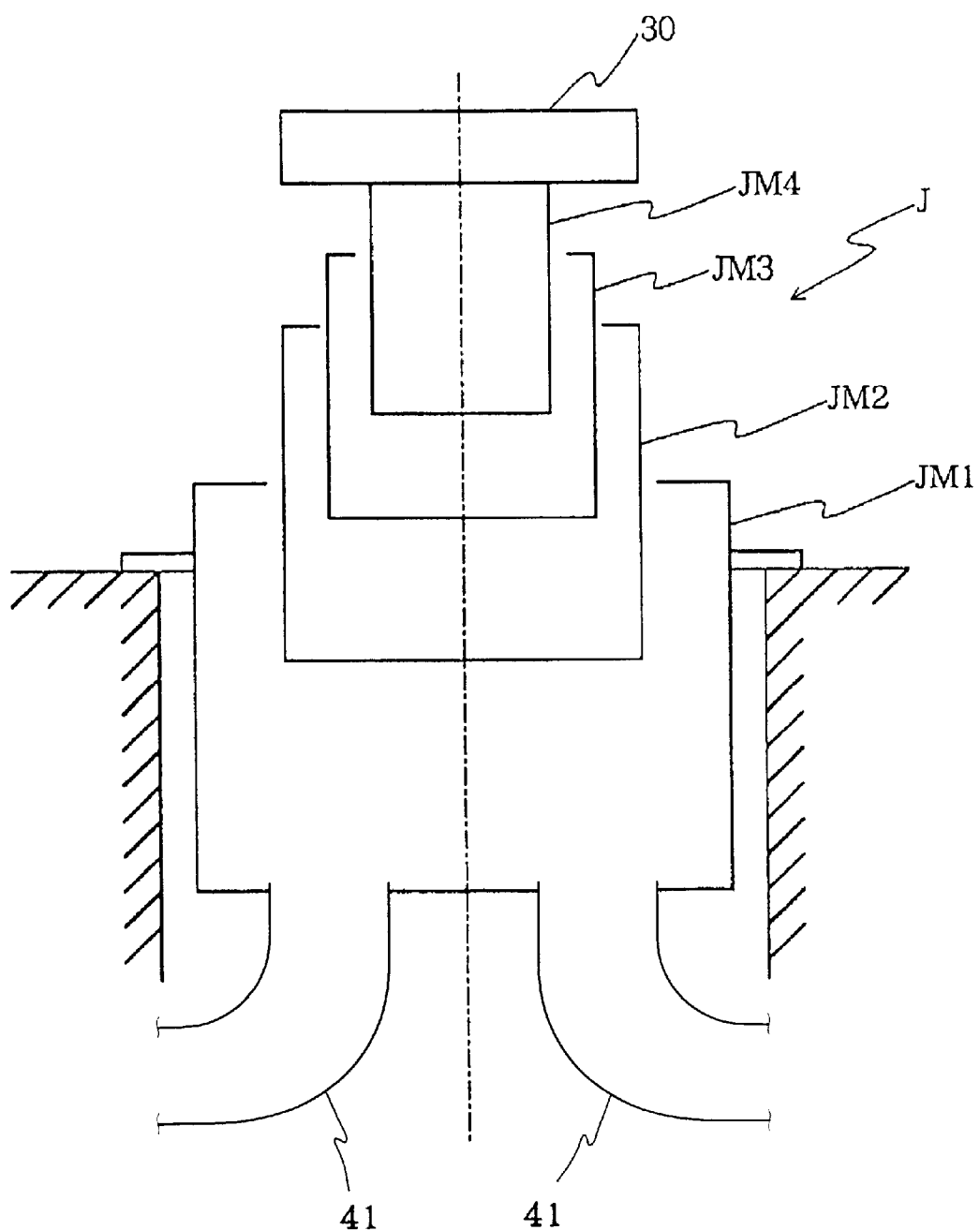
FIG. 16 is a schematic view showing an alternative robot of the present invention.

As shown in FIG. 15, inside of a lower end portion of the up-down axis J, i.e., inside of a lower end portion of the first axis sectional element JM1, exhaust fans 40 are provided to cause an interior of the up-down axis J to have a negative pressure. For this reason, powder dust is prevented from being ejected from slide portions of the axis sectional elements JM1, JM2, JM3, JM4 into the clean room. As shown in FIG. 16, the exhaust fans 40 may be replaced by exhaust ducts 41 connected to the lower end portion of the first axis sectional element JM1 to cause the interior of the up-down axis J to have a negative pressure. In FIGS. 15, 16, reference R denotes a robot.

Thus, in the robot R of this embodiment, the up-down axis is structured such that the axis sectional elements SM including constituents of the subordinate up-down mechanisms S are integrated on one side of the up-down axis, moment applied on the guide mechanism G and the axis sectional element JM can be significantly reduced as compared to a case where the subordinate up-down mechanism elements S are alternately placed. Consequently, distortion of each of the axis sectional elements JM1, JM2, JM3, JM4 can be significantly reduced while they are moved up/down and the up-down axis J can be smoothly moved up/down. Also, since the subordinate up-down mechanisms S are integrated on one side of the up-down axis J, the guide mechanisms G can be also integrated on one side where the subordinate up-down mechanisms S are provided. Therefore, configuration can be easily simplified. Further, since the main up-down mechanism E is also integrated on one side of the up-down axis J where the subordinate up-down mechanisms S are provided, maintenance for them can be efficiently made.

While the description has been given to the embodiment of the present invention, the present invention is not limited to this, and can be modified in various ways. For example, while in this embodiment, the up-down axis has a size reducable in a direction from the base end thereof toward the tip end thereof, this may have a size reducable in a direction from the tip end toward the base end.

As described in detail, according to the present invention, the telescopic-drive mechanism is integrated on one side of the up-down axis without being exposed therefrom. Therefore, the powder dust generated as a result of operation of the telescopic-drive mechanism is prevented from flying to all directions in the clean room, and simultaneously, the configuration of the robot can be simplified.

In addition, since transfer and installation can be carried out with the robot retracted, space efficiency in transfer is improved and complexity of installation operation is avoided. Correspondingly, a transfer cost and an installation cost are reduced.

Further, according to the preferred embodiment of the present invention, since the operation axis unit is rotatably provided on the top portion of the up-down axis, the foot area in equipment which the robot occupies becomes substantially as small as a bottom area of the first axis sectional element at the base end, and therefore, the equipment can be easily made compact. Moreover, since the operation axis unit is positioned at the highest position, the work such as the wafer is prevented from being contaminated by the power dust caused by the operation of the operation axis unit.

As this invention may be embodied in several forms without departing from the sprit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A robot comprising:
   a telescopic member in which a plurality of hollow axis sectional elements telescopically continue; and
   a telescopic-drive mechanism for driving the telescopic member to be vertically extended or retracted between an extended state in which a tip end of the telescopic member extends with respect to a base end thereof and a retracted state in which the tip end is moved close to the base end, the telescopic drive mechanism including a main telescopic means for moving a second axis sectional element up or down with respect to a first axis sectional element situated at the base end, the second axis sectional element being situated above the first axis sectional element, and a subordinate telescopic means for moving remaining axis sectional elements other than the second axis sectional element up or down following an up movement or down movement of the second axis sectional element, the subordinate telescopic means including a band-shaped or line-shaped drive member having flexibility, and a rotating member, wherein the rotating member is rotatably mounted to an upper end portion of a storage portion of an intermediate axis sectional element, the drive member is installed around the rotating member, and the drive member has a lower end portion attached to a lower axis sectional element and an upper end portion attached to a upper axis sectional element, wherein
   the telescopic-drive mechanism is integrated on one circumferential position of the telescopic member without being exposed from the telescopic member, the subordinate telescopic means including a separating plate, the band-shaped or line-shaped drive member being attached to the separating plate at the lower axis sectional element, the storage portion being provided with a storage concave portion formed in a corresponding inner surface of the lower axis sectional element, the storage concave portion being extended in the longitudinal direction of the telescopic movements so as to store the drive member and the rotating member in an unexposed fashion, the drive member being disposed in an upper position of the storage concave portion and not protruding from the upper end of the storage concave portion so that the rotating member and the drive member installed around the rotating member are unexposed.

2. The robot according to claim 1, wherein an interior of the telescopic member has a negative pressure.

3. The robot according to claim 1, further comprising an exhaust means provided at a lower end portion of the telescopic member for exhausting a gas inside of the telescopic member.

4. The robot according to claim 2, further comprising an exhaust duct provided at a lower end portion of the telescopic member such that the exhaust duct communicates with the interior of the telescopic member.

5. The robot according to claim 1, wherein the telescopic member has a substantially rectangular cross section and the main telescopic means and the subordinate telescopic means are provided on a side face of a long side of the rectangular cross section of the telescopic member.

6. The robot according to claim 5, wherein the main telescopic means comprises a ball screwing mechanism.

7. The robot according to claim 1, wherein a plurality of drive members are installed in parallel around the rotating member.

8. The robot according to claim 1, further comprising a guide portion for guiding up movement or down movement of the plurality of axis sectional elements driven by the main telescopic means and the subordinate telescopic means.

9. The robot according to claim 8, wherein the guide portion is provided adjacently to the subordinate telescopic means.

10. A robot comprising:
    a telescopic member in which a plurality of hollow axis sectional elements telescopically continue;
    a telescopic-drive mechanism for driving the telescopic member to be vertically extended or retracted between an extended state in which a tip end of the telescopic member extends with respect to a base end thereof and a retracted state in which the tip end is moved close to the base end, the telescopic drive mechanism including a main telescopic means for moving a second axis sectional element up or down with respect to a first axis sectional element situated at the base end, the second axis sectional element being situated above the first axis sectional element, and a subordinate telescopic means for moving remaining axis sectional elements other than the second axis sectional element up or down following an up movement or down movement of the second axis sectional element, the subordinate telescopic means including a band-shaped or line-shaped drive member having flexibility, and a rotating member, wherein the rotating member is rotatably mounted to an upper end portion of a storage portion of an intermediate axis sectional element, the drive member is installed around the rotating member, and the drive member has a lower end portion attached to a lower axis sectional element and an upper end portion attached to a upper axis sectional element; and an operation axis unit having a rotatable base provided at a top portion of the telescopic member, wherein the telescopic-drive mechanism is integrated on one circumferential position of the telescopic member without being exposed from the telescopic member, the subordinate telescopic means including a separating plate, the band-shaped or line-shaped drive member being attached to the separating plate at the lower axis sectional element, the storage portion being provided with a storage concave portion formed in a corresponding inner surface of the lower axis sectional element, the storage concave portion being extended in the longitudinal direction of the telescopic movements so as to store the drive member and the rotating member in an unexposed fashion, the drive member being disposed in an upper position of the storage concave portion and not protruding from the upper end of the storage concave portion so that the rotating member and the drive member installed around the rotating member are unexposed.

11. The robot according to claim 10, wherein an interior of the telescopic member has a negative pressure.

12. The robot according to claim 11, further comprising an exhaust means provided at a lower end portion of the telescopic members for exhausting a gas inside of the telescopic member.

13. The robot according to claim 11, further comprising an exhaust duct provided at a lower end portion of the telescopic member such that the exhaust duct communicates with the interior of the telescopic member.

14. The robot according to claim 10, wherein the telescopic member has a substantially rectangular cross section and the main telescopic means and the subordinate telescopic means are provided on a side face of a long side of the rectangular cross section of the telescopic member.

15. The robot according to claim 14, wherein the main telescopic means comprises a ball screwing mechanism.

16. The robot according to claim 10, wherein a plurality of drive members are installed in parallel around the rotating member.

17. The robot according to claim 10, further comprising a guide portion for guiding an up movement or down movement of the plurality of axis sectional elements driven by the main telescopic means and the subordinate telescopic means.

18. The robot according to claim 17, wherein the guide portion is provided adjacently to the subordinate telescopic means.

19. The robot of claim 1, wherein the lower axis sectional element includes a guide member longitudinally provided along an outer surface of the lower axis sectional element opposing the upper axis sectional element, and the upper axis sectional element includes a guide groove longitudinally provided along an inner surface of the upper axis sectional element opposing the lower axis sectional element so as to fit onto the guide member slidably in the longitudinal direction.

20. The robot of claim 19, wherein two sets of the guide members and the guide grooves are each provided so as to intervene the storage portion therebetween.

21. The robot of claim 10, wherein the lower axis sectional element includes a guide member longitudinally provided along an outer surface of the lower axis sectional element opposing the upper axis sectional element, and the upper axis sectional element includes a guide groove longitudinally provided along an inner surface of the upper axis sectional element opposing the lower axis sectional element so as to fit onto the guide member slidably in the longitudinal direction.

22. The robot of claim 21, wherein two sets of the guide members and the guide grooves are each provided so as to intervene the storage portion therebetween.

* * * * *

UNITED STATES PATENT AND TRADEMARK OFFICE
CERTIFICATE OF CORRECTION

PATENT NO.   : 6,688,189 B2
DATED        : February 10, 2004
INVENTOR(S)  : Yasuhiko Hashimoto et al.

It is certified that error appears in the above-identified patent and that said Letters Patent is hereby corrected as shown below:

<u>Title page,</u>
Item [75], Inventors, please delete inventor name "Kobe" and insert -- Kyoto --.

<u>Column 12,</u>
Line 27, please delete "members" and insert -- member --.

Signed and Sealed this

Twenty-second Day of June, 2004

JON W. DUDAS
*Acting Director of the United States Patent and Trademark Office*